US010642929B2

(12) United States Patent
Ukai

(10) Patent No.: US 10,642,929 B2
(45) Date of Patent: May 5, 2020

(54) INFORMATION DISPLAY DEVICE, INFORMATION DISPLAY METHOD AND INFORMATION DISPLAY PROGRAM

(71) Applicant: Rakuten, Inc., Setagaya-ku (JP)

(72) Inventor: Hiroshi Ukai, Setagaya-ku (JP)

(73) Assignee: RAKUTEN, Inc., Tokyo (JP)

( * ) Notice: Subject to any disclaimer, the term of this patent is extended or adjusted under 35 U.S.C. 154(b) by 81 days.

(21) Appl. No.: 15/569,425

(22) PCT Filed: Apr. 30, 2015

(86) PCT No.: PCT/JP2015/062991
§ 371 (c)(1),
(2) Date: Apr. 16, 2018

(87) PCT Pub. No.: WO2016/174771
PCT Pub. Date: Nov. 3, 2016

(65) Prior Publication Data
US 2018/0217969 A1   Aug. 2, 2018

(51) Int. Cl.
*G06F 17/24* (2006.01)
(52) U.S. Cl.
CPC ................... *G06F 17/241* (2013.01)
(58) Field of Classification Search
CPC ....................................................... G06F 17/24
See application file for complete search history.

(56) References Cited

U.S. PATENT DOCUMENTS

| 5,625,833 | A | * | 4/1997 | Levine et al. | .......... G06F 15/00 |
| 2008/0147841 | A1 | * | 6/2008 | Nishino et al. | ....... G06F 15/173 |
| 2009/0327855 | A1 | * | 12/2009 | Le | ........................... G06F 17/00 |
| 2010/0011282 | A1 | * | 1/2010 | Dollard et al. | ......... G06F 17/00 |
| 2010/0058166 | A1 | | 3/2010 | Chikyu | |
| 2012/0060082 | A1 | * | 3/2012 | Edala et al. | ............ G06F 17/00 |
| 2014/0189486 | A1 | * | 7/2014 | Yasoshima | ............ G06F 17/241 |
| 2014/0189489 | A1 | * | 7/2014 | Yasoshima | .............. G06F 17/24 |

OTHER PUBLICATIONS

English translation of the International Preliminary Report on Patentablity and Written Opinion dated Nov. 9, 2017 in PCT/JP2015/062991, 6 pages.

* cited by examiner

*Primary Examiner* — James J Debrow
(74) *Attorney, Agent, or Firm* — Xsensus LLP

(57) ABSTRACT

An information display device that includes circuitry that receives specification of an annotation position indicating a position of an annotation in display information to be displayed on a display; when specification of the annotation position is received, generates an annotation code corresponding to the annotation position, and stores the generated annotation code in association with the annotation position into a memory; outputs the generated annotation code in a format recognizable to an operator; receives input of annotation information containing at least the annotation code and representing the annotation; and performs control so that, when the annotation code contained in the received annotation information matches the annotation code stored in the memory, the annotation information is output at the position in the display information indicated by the annotation position corresponding to the annotation code.

12 Claims, 12 Drawing Sheets

*Fig.4*

| ANNOTATION CODE | ANNOTATION POSITION | ANNOTATION INFORMATION |
|---|---|---|
| AC1(S5Dju) | AP1 | — |
| ⋮ | ⋮ | ⋮ |
| ⋮ | ⋮ | ⋮ |

*Fig.7*

| ANNOTATION CODE | ANNOTATION POSITION | ANNOTATION INFORMATION |
|---|---|---|
| AC1(S5Dju) | AP1 | AN1 |
| ⋮ | ⋮ | ⋮ |
| ⋮ | ⋮ | ⋮ |

INFORMATION DISPLAY DEVICE, INFORMATION DISPLAY METHOD AND INFORMATION DISPLAY PROGRAM

TECHNICAL FIELD

The present invention relates to an information display device, an information display method and an information display program.

BACKGROUND ART

A technique that displays document information such as an electronic book on an information processing device and adds an annotation to an arbitrary position in the document is known. For example, Patent Literature 1 discloses a technique that makes an annotation object on a significant part of an electronic document.

CITATION LIST

Patent Literature

PTL1: Japanese Unexamined Patent Publication No. 2010-61311

SUMMARY OF INVENTION

Technical Problem

However, there is a case where a user desires to add an annotation to a certain position in a document but the content of the annotation is not yet determined. In such a case, the user needs to stop viewing the document until the content of the annotation is determined, which is inconvenient. Further, if the user continues to view the document without determining the content of the annotation, it is necessary to return to the position to add the annotation, which is also inconvenient.

In view of the foregoing, an object of the present invention is to make it possible to, after a position to add an annotation is decided, add an annotation to this position with easy operation when the content of the annotation is determined.

Solution to Problem

To solve the above problem, an information display device according to one aspect of the present invention includes a specification reception means for receiving specification of an annotation position indicating a position of an annotation in display information to be displayed on a display means, a generation means for, when specification of the annotation position is received, generating an annotation code corresponding to the annotation position and storing the generated annotation code in association with the annotation position into a storage means, an output means for outputting the annotation code generated by the generation means in a format recognizable to an operator, a reception means for receiving input of annotation information containing at least the annotation code and representing the annotation, and a control means for performing control so that, when the annotation code contained in the annotation information received by the reception means matches the annotation code stored in the storage means, the annotation information is output at the position in the display information indicated by the annotation position corresponding to the annotation code.

An information display method according to one aspect of the present invention is an information display method in an information display device, the method including a specification reception step of receiving specification of an annotation position indicating a position of an annotation in display information to be displayed on a display means, a generation step of, when specification of the annotation position is received, generating an annotation code corresponding to the annotation position and storing the generated annotation code in association with the annotation position into a storage means, an output step of outputting the annotation code generated in the generation step in a format recognizable to an operator, a reception step of receiving input of annotation information containing at least the annotation code and representing the annotation, and a control step of performing control so that, when the annotation code contained in the annotation information received in the reception step matches the annotation code stored in the storage means, the annotation information is output at the position in the display information indicated by the annotation position corresponding to the annotation code.

An information display program according to one aspect of the present invention causes a computer to implement a specification reception function for receiving specification of an annotation position indicating a position of an annotation in display information to be displayed on a display means, a generation function for, when specification of the annotation position is received, generating an annotation code corresponding to the annotation position and storing the generated annotation code in association with the annotation position into a storage means, an output function for outputting the annotation code generated by the generation function in a format recognizable to an operator, a reception function for receiving input of annotation information containing at least the annotation code and representing the annotation, and a control function for performing control so that, when the annotation code contained in the annotation information received by the reception function matches the annotation code stored in the storage means, the annotation information is output at the position in the display information indicated by the annotation position corresponding to the annotation code.

According to the above aspect, when specification of an annotation position is received, an annotation code corresponding to the annotation position is generated and stored, and also output in a format recognizable to an operator. Then, input of annotation information containing the annotation code is received, and when the annotation code matches the stored annotation code, the annotation information is controlled to be output at the position indicated by the annotation position corresponding to the annotation code. Thus, when an operator desires to add an annotation to a certain position in display information, the operator specifies this position as an annotation position, and the operator can thereby recognize an annotation code. At the time when the content of the annotation is determined, the operator inputs annotation information containing the content of the annotation together with the recognized annotation code, so that the annotation information is output in association with the annotation position. It is thereby possible to add an annotation by easy operation when the content of the annotation is determined.

In the information display device according to another aspect, the control means may display a position in the display information at which the annotation information is to be output.

According to the above aspect, by inputting the annotation code, the annotation position corresponding to the annotation code in the display information is displayed, and it is thereby possible to easily recognize the annotation position.

The information display device according to another aspect may further include a process control means for performing control so that, when specification of a certain position is received by the specification reception means, one of a process for generating and outputting the annotation code and a process for receiving input of the annotation information is carried out in preference to the other.

According to the above aspect, because control is performed so that any one of a process for receiving input of annotation information and a process for generating an annotation code etc., is carried out in preference to the other, it is possible to promptly carry out the process that is controlled by priority.

In the information display device according to another aspect, when a position for which specification is received by the specification reception means is a position already specified as the annotation position and the annotation code corresponding to this annotation position is already generated and output, the process control means may perform control so that a process for receiving input of the annotation information is carried out in preference to a process for generating and outputting the annotation code.

In the case where an operation to specify a position that is already specified as the annotation position and where generation, storage and output of the annotation code corresponding to this annotation position are done is received, it is highly probable that an operator who has performed the operation to specify the position is about to input annotation information. According to the above aspect, when specification of a position that is already specified as the annotation position is received, a process for receiving input of annotation information is carried out in preference to a process for generating an annotation code etc., and it is thereby possible to input the annotation information promptly.

In the information display device according to another aspect, when the display information is displayed for the first time in the information display device, the process control means may perform control so that a process for generating and outputting the annotation code is carried out in preference to a process for receiving input of the annotation information, and when the display information is displayed for the second or subsequent time in the information display device, the process control means may perform control so that a process for receiving input of the annotation information is carried out in preference to a process for generating and outputting the annotation code.

In the case where specification of a certain position in the display information is received when the display information is displayed for the first time in the information display device, it is highly probable that an operator who has performed the operation to specify the position is about to specify an annotation position. On the other hand, in the case where specification of a certain position in the display information is received when the display information is displayed not for the first time in the information display device, it is highly probable that an operator who has performed the operation to specify the position is about to input annotation information. According to the above aspect, when specification of a position is received in the display information that is displayed for the first time in the information display device, a process for generating an annotation code etc. is carried out in preference to a process for receiving input of annotation information, and it is thereby possible to carry out the process related to generation of an annotation code promptly. On the other hand, when specification of a position is received in the display information that has been displayed two or more times in the information display device, a process for receiving input of annotation information is carried out in preference to a process for generating an annotation code etc., and it is thereby possible to input the annotation information promptly.

In the information display device according to another aspect, the generation means may set a validity period of the annotation code in accordance with an operation for specifying the annotation position, and the validity period may be a period where input of annotation information containing the annotation code can be received and where the annotation code is stored in association with the annotation position.

According to the above aspect, it is possible to arbitrary set the validity period during which annotation information using the annotation code can be input, and it is thereby possible to set the validity period of the annotation code to be shorter when it does not take a long time to determine the content of an annotation. Therefore, it is possible to save process resources for storing the annotation code. On the other hand, when it takes a long time to determine the content of an annotation, it is possible to set the validity period of the annotation code to be longer. It is therefore possible to reserve a desired time for an operator to determine the content of an annotation.

In the information display device according to another aspect, the annotation code may be one or more text letters.

According to the above aspect, an operator can easily recognize the annotation code.

In this aspect, the generation means may generate, as the annotation code, a character string different from a character string contained in the display information.

There is a case where a character string contained in the display information is used in the content of an annotation. According to the above aspect, a character string of the annotation code is generated so that it does not match the character string contained in the display information, thereby preventing a confusion of the content of an annotation in the annotation information and the annotation code. It is thereby possible to prevent false recognition of the annotation code when inputting the annotation information.

In the information display device according to another aspect, the annotation code may be sound information.

According to the above aspect, an operator can easily recognize the annotation code by the sense of hearing.

In the information display device according to another aspect, an annotation contained in the annotation information may be composed of text or sound information.

According to the above aspect, it is possible to associate a variety of types of annotations with the display information.

Advantageous Effects of Invention

According to one aspect of the present invention, after a position to add an annotation is decided, it is possible to add an annotation to this position with easy operation when the content of the annotation is determined.

BRIEF DESCRIPTION OF DRAWINGS

FIG. 4 is a view showing a configuration of an annotation information storage unit 18 and an example of data stored therein.

FIG. 7 is a view showing an example of the annotation information storage unit 18 in which annotation information is stored.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
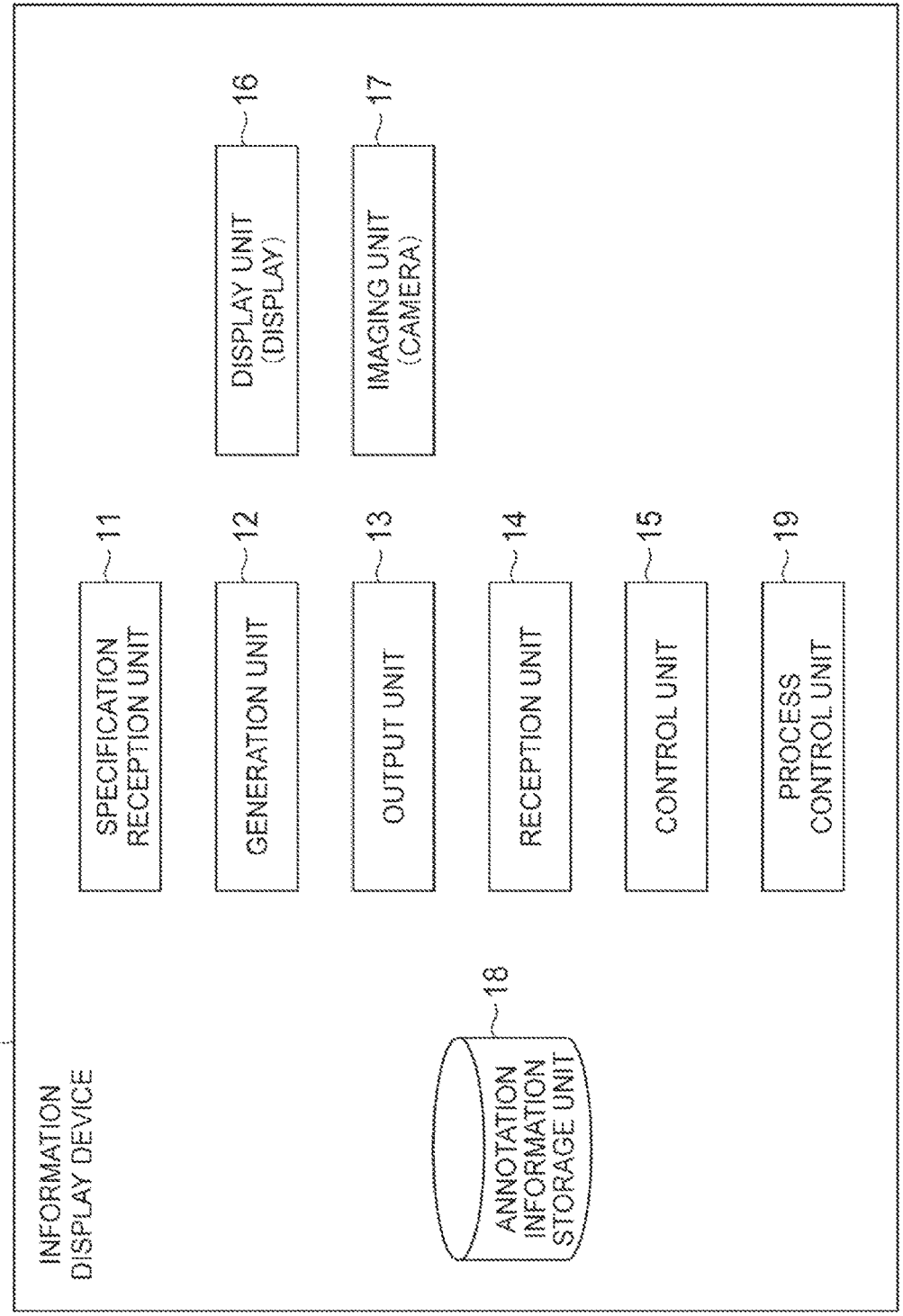
FIG. 1 is a block diagram showing a functional configuration of an information display device.

FIG. 1 is a block diagram showing a functional configuration of an information display device 1 according to this embodiment. The information display device 1 is a device that displays visually recognizable display information on a display means. Further, the information display device 1 controls addition of an annotation to an arbitrary position in the displayed display information.

A device that constitutes the information display device 1 is not particularly limited. For example, it may be a stationary or portable personal computer, a mobile terminal such as an advanced mobile phone (smart phone), a cellular phone or a personal digital assistant (tablet, PDA) or the like.

The display information is a document containing text, images and the like, and it is an electronic book, for example. Further, the display information may be a document displayed by word processor software, content displayed on a browser or the like.

As shown in FIG. 1, the information display device 1 functionally includes a specification reception unit 11 (specification reception means), a generation unit 12 (generation means), an output unit 13 (output means), a reception unit 14 (reception means), and a control unit 15 (control means). Further, the information display device 1 includes a display unit 16, an imaging unit 17 and a process control unit 19 (process control means). The display unit 16 consists of a device such as a display, for example. Further, the imaging unit 17 consists of a device such as a camera, for example.

Note that, although the imaging unit 17 is included in the information display device 1 in this embodiment, it may be configured as an external device that is connected to the information display device 1.

Further, the information display device 1 includes an annotation information storage unit 18 as a storage means. Note that, although the annotation information storage unit 18 is included in the information display device 1 in this embodiment, it may be configured as a storage means that can be accessible from the information display device 1.

Figure 2:
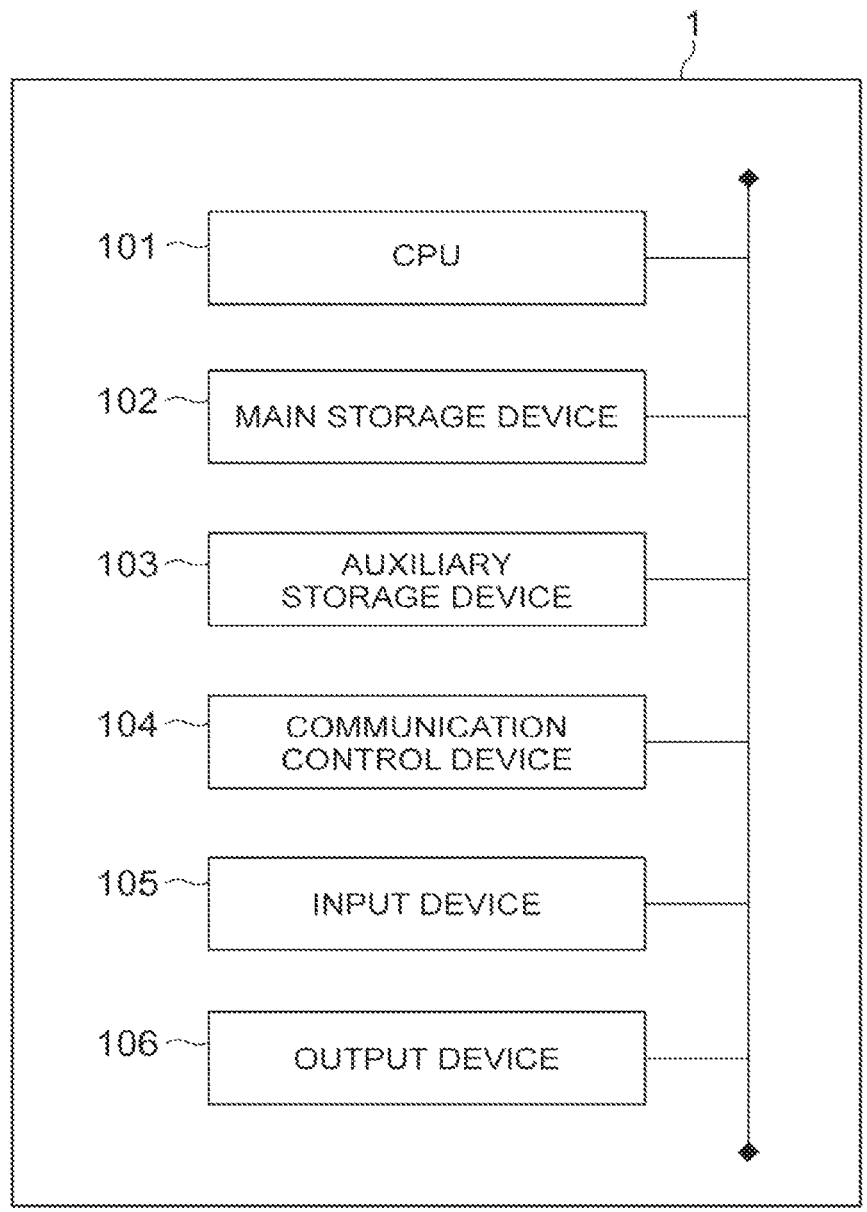
FIG. 2 is a view showing a hardware configuration of an information display device.

FIG. 2 is a hardware configuration diagram of the information display device 1. As shown in FIG. 2, the information display device 1 is physically configured as a computer system that includes a CPU 101, a main storage device 102 such as memory like RAM and ROM, an auxiliary storage device 103 such as a hard disk, a communication control device 104 and the like. The information display device 1 may further include an input device 105 such as a keyboard, a touch panel and a mouse, an output device 106 such as a display and the like.

The functions shown in FIG. 1 are implemented by loading given computer software onto hardware such as the CPU 101 or the main storage device 102 shown in FIG. 2, making the communication control device 104 and the like operate under control of the CPU 101, and performing reading and writing of data in the main storage device 102 or the auxiliary storage device 103. Data and database required for the processing is stored in the main storage device 102 or the auxiliary storage device 103.

The display unit 16 shown in FIG. 1 corresponds to the output device 106 for outputting images. Further, the information display device 1 may include a speaker for outputting a sound internally or externally as the output device 106. The imaging unit 17 shown in FIG. 1 corresponds to the input device 105 for inputting images. Further, the information display device 1 may include a microphone for inputting a sound internally or externally as the input device 105.

Referring back to FIG. 2, the functional units of the information display device 1 are described hereinbelow. The specification reception unit 11 is a part that receives specification of an annotation position indicating the position of an annotation in display information. An example of the display information is a document containing text, images and the like which is visually recognizable as described above, a case where an electronic book is displayed as the display information is described in this embodiment.

Figure 3:
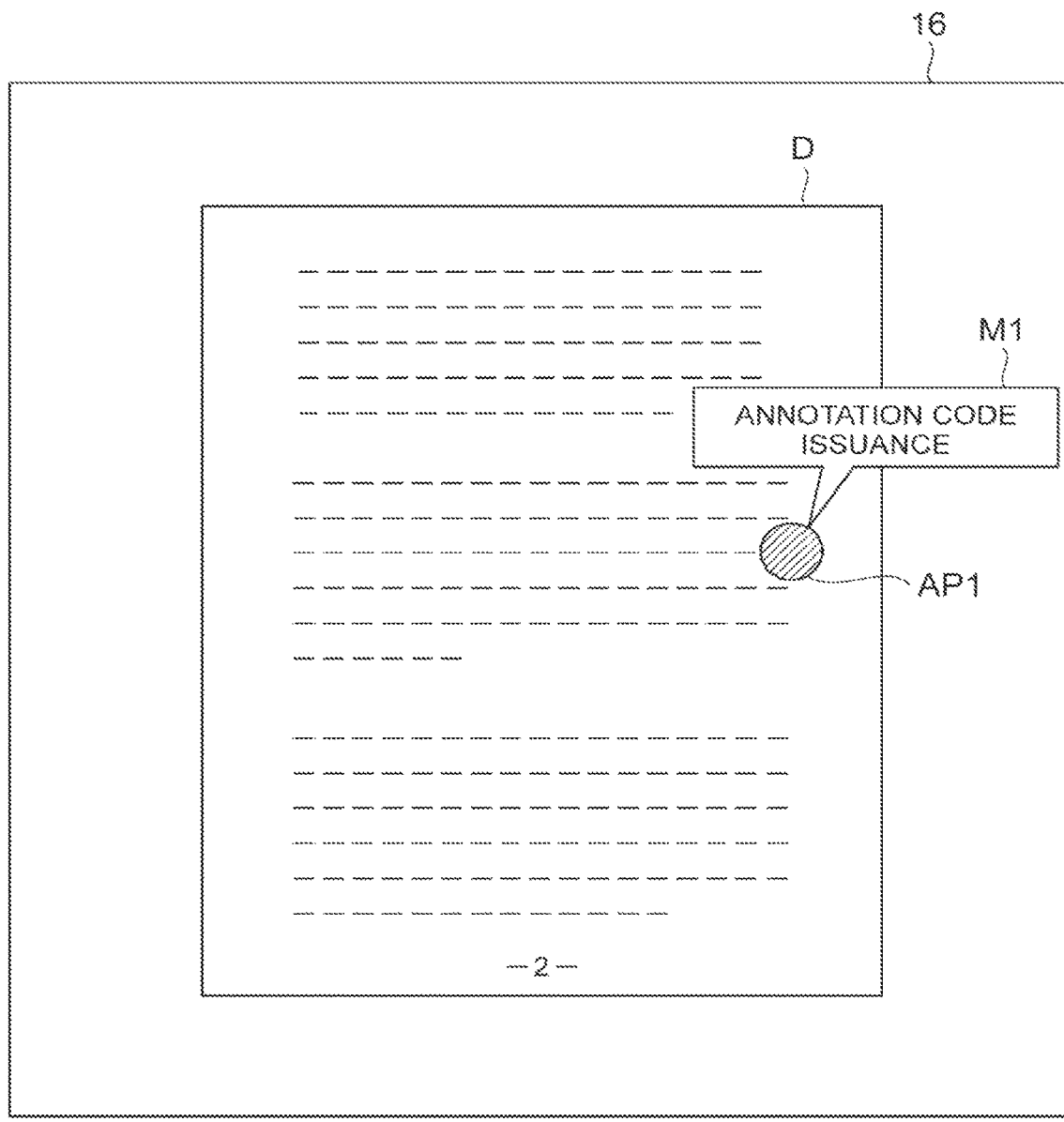
FIG. 3 is a view showing an example of display information.

FIG. 3 is a view showing an example of display information D that is displayed on the display unit 16. For example, when a user, who is an operator of the information display device 1, performs a predetermined operation that specifies a position to add an annotation in the display information D, which is an electronic book, displayed on a display that constitutes the display unit 16, the specification reception unit 11 receives the specified position as the annotation position AP1. The operation for specifying an annotation position is an operation of long press on a position to add an annotation, for example.

Further, as shown in FIG. 3, when specification of an annotation position is received, control may be performed so that a dialog M to designate issuance of an annotation code or indicating issuance of an annotation code is displayed in association with the annotation position AP1. Note that the annotation code is described later.

The generation unit 12 is a part that, when specification of an annotation position is received by the specification reception unit 11, generates an annotation code corresponding to the annotation position.

An annotation code is composed of information that is recognizable to a user, and it is composed of text, for example. Since an annotation code is composed of text, a user can easily recognize the annotation code. An annotation code may be a character string composed of a plurality of text letters that are selected at random or may be one character string selected from a plurality of character strings that are set in advance.

Further, the generation unit 12 may generate, as an annotation code, a character string different from a character string contained in the display information D. This reduces the possibility that the same character string as an annotation code is contained in an annotation, and it is thereby possible to prevent false recognition of an annotation code when inputting annotation information. Although the number of text letters that constitute an annotation code is not limited, it may be about 5 characters, for example.

In this embodiment, the generation unit 12 generates the character string "S5Dju" as the annotation code AC1 corresponding to the annotation position AP1.

Further, the generation unit 12 stores the generated annotation code and the annotation position in association with each other into the storage means. In this embodiment, the generation unit 12 stores the annotation code into the annotation information storage unit 18.

FIG. 4 is a view showing the configuration of the annotation information storage unit 18 and an example of data stored therein. The annotation information storage unit 18 is a storage means for storing the association between an annotation code and an annotation position. As shown in FIG. 4, the annotation information storage unit 18 stores the annotation code AC1 and the annotation position AP1 in association with each other. Further, as described later, the annotation information storage unit 18 may store the content of an annotation in association with the annotation code and the annotation position.

Because the annotation code and the annotation position are stored in association with each other as described above, the annotation position can be identified based on the annotation code after the receipt of specification of the annotation position.

Further, the generation unit 12 may set the validity period of an annotation code in accordance with the operation for specification of an annotation position. The validity period of an annotation code is a period where input of annotation information containing the annotation code can be received and where the annotation code is stored in association with the annotation position. In this embodiment, the validity period of an annotation code is a period during which an annotation code is stored in association with an annotation position in the annotation information storage unit 18.

For example, in the case where specification of an annotation position is received by long press on a position to add an annotation, the generation unit 12 sets the validity period of an annotation code in accordance with the duration of long press on the annotation position. The generation unit 12 then stores the set validity period in association with the annotation code and the annotation position into the annotation information storage unit 18. When the validity period expires, the generation unit 12 deletes the annotation code. By such control of the validity period of an annotation code, it is possible to arbitrarily set the validity period during which annotation information using an annotation code can be input, and it is thereby possible to set the validity period of an annotation code to be shorter when it does not take a long time to determine the content of an annotation. Therefore, it is possible to save process resources for storing the annotation code. On the other hand, when it takes a long time to determine the content of an annotation, it is possible to set the validity period of an annotation code to be longer. It is thereby possible to reserve a desired time for a user to determine the content of an annotation.

Figure 5:
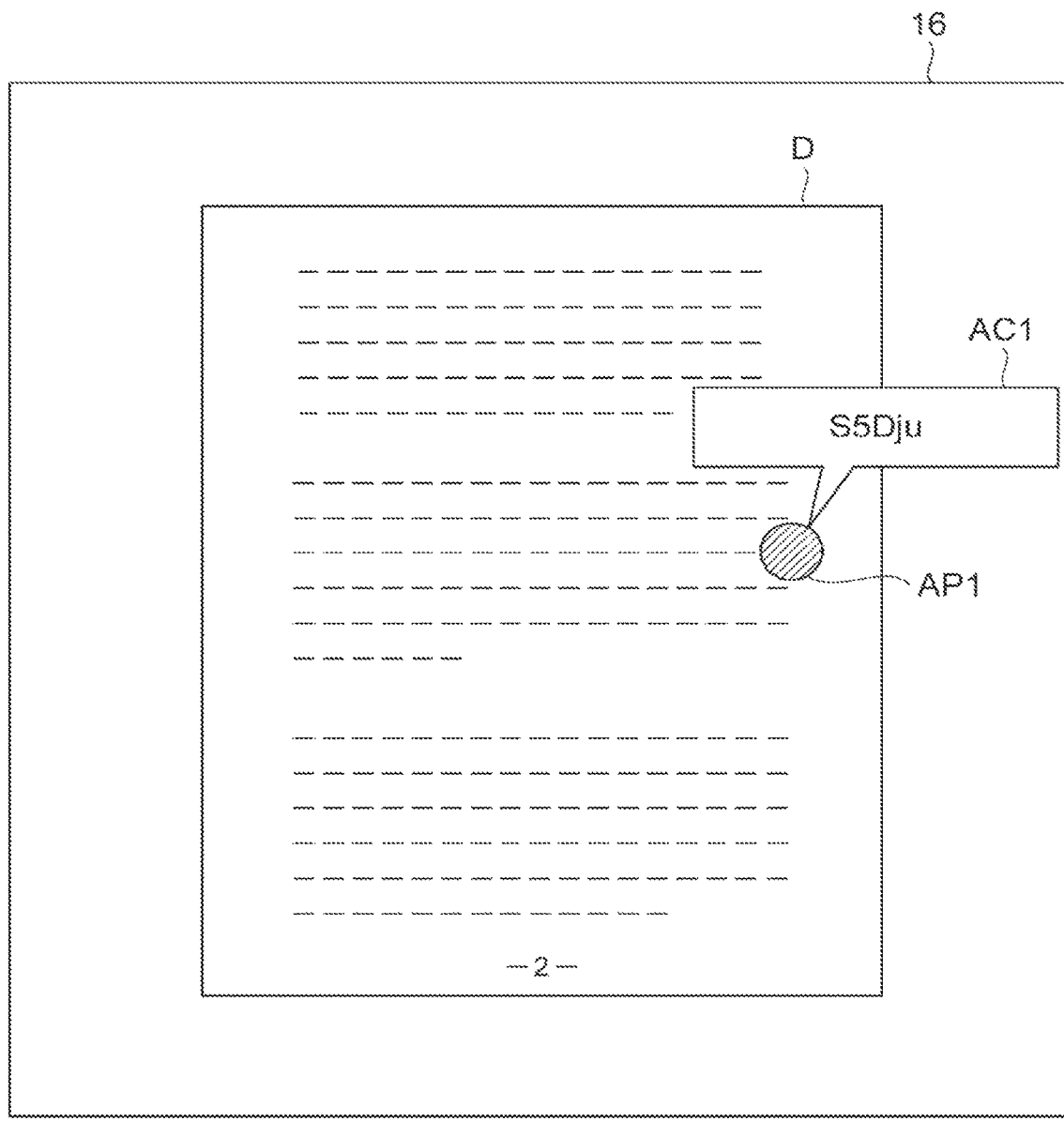
FIG. 5 is a view showing an example of output of an annotation code.

The output unit 13 is a part that outputs the generated and stored annotation code in a format recognizable to a user. In this embodiment, the output unit 13 displays a character string representing an annotation code on the display unit 16. FIG. 5 is a view showing an example of output of an annotation code. In this embodiment, as shown in FIG. 5, the output unit 13 displays, on the display unit 16, the annotation code AC1 "S5Dju" in association with the annotation position AP1. Since the annotation code is displayed in this manner, a user can record the annotation code in a note or the like, for example. By recording the annotation code, the user can input annotation information containing the recorded annotation code to the information display device 1 later on.

The reception unit 14 is a part that receives input of annotation information which contains at least an annotation code and represents an annotation. In this embodiment, the reception unit 14 receives, as the annotation information, an image of a paper medium in which an annotation code is written, which is taken by the imaging unit 17. Since the content of an annotation is contained in the paper medium in which the annotation code is written, the reception unit 14 can receive the annotation information containing the content of an annotation.

Figure 6:
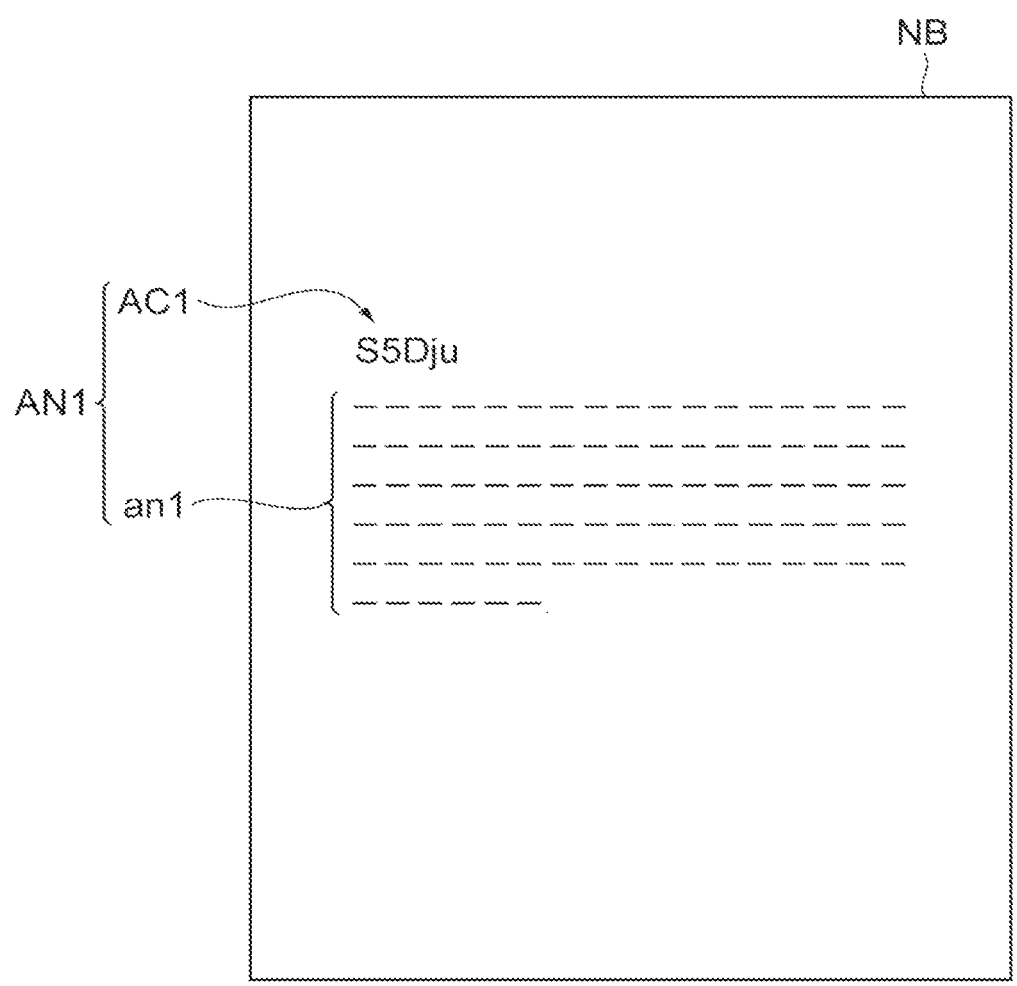
FIG. 6 is a view showing an example of a paper medium for input of annotation information.

FIG. 6 is a view showing an example of a paper medium for input of annotation information. On the paper medium NB, the annotation information AN1 is shown. The annotation information AN1 contains the annotation code AC1. Further, the annotation information AN1 contains the annotation content an1. The annotation content an1 is the content of an annotation which a user desires to add at the annotation position AP1. Specifically, after a user specifies the annotation position AP1, the user writes the annotation content an1 together with the annotation code AC1 on the paper medium NB at the time when the content of an annotation to be associated with the annotation position AP1 is determined. Then, with use of the imaging unit 17, the user takes an image of the paper medium NB on which the annotation information AN1 containing the annotation code AC1 and the annotation content an1 is written, thereby inputting the annotation information AN1.

The reception unit 14 stores the received annotation information in association with the annotation code contained in the annotation information into the annotation information storage unit 18. FIG. 7 is a view showing an example of the annotation information storage unit 18 in which annotation information is stored. As shown in FIG. 7, the reception unit 14 stores the annotation information AN1 extracted from the taken image of the paper medium NB in association with the annotation code AC1 and the annotation position AP1 into the annotation information storage unit 18.

Note that the annotation information that is stored in association with the annotation code and the annotation position may be the entire image received as the annotation information by the reception unit 14, or it may be the image of the annotation content an1 part which is extracted from the taken image of the paper medium NB shown in FIG. 6 (the image without the annotation code AC1). Further, text information acquired from the image of the annotation content an1 by the existing OCR technology may be stored as the annotation information.

Furthermore, the content of an annotation received by the reception unit 14 may be a sound. In such a case, the reception unit 14 may receive input of a sound representing the content of an annotation which is uttered by a user, for example, through a microphone (an example of the input device 105) included in the information display device 1. The reception unit 14 then stores the annotation information containing the annotation content input by the sound into the annotation information storage unit 18.

Figure 8:
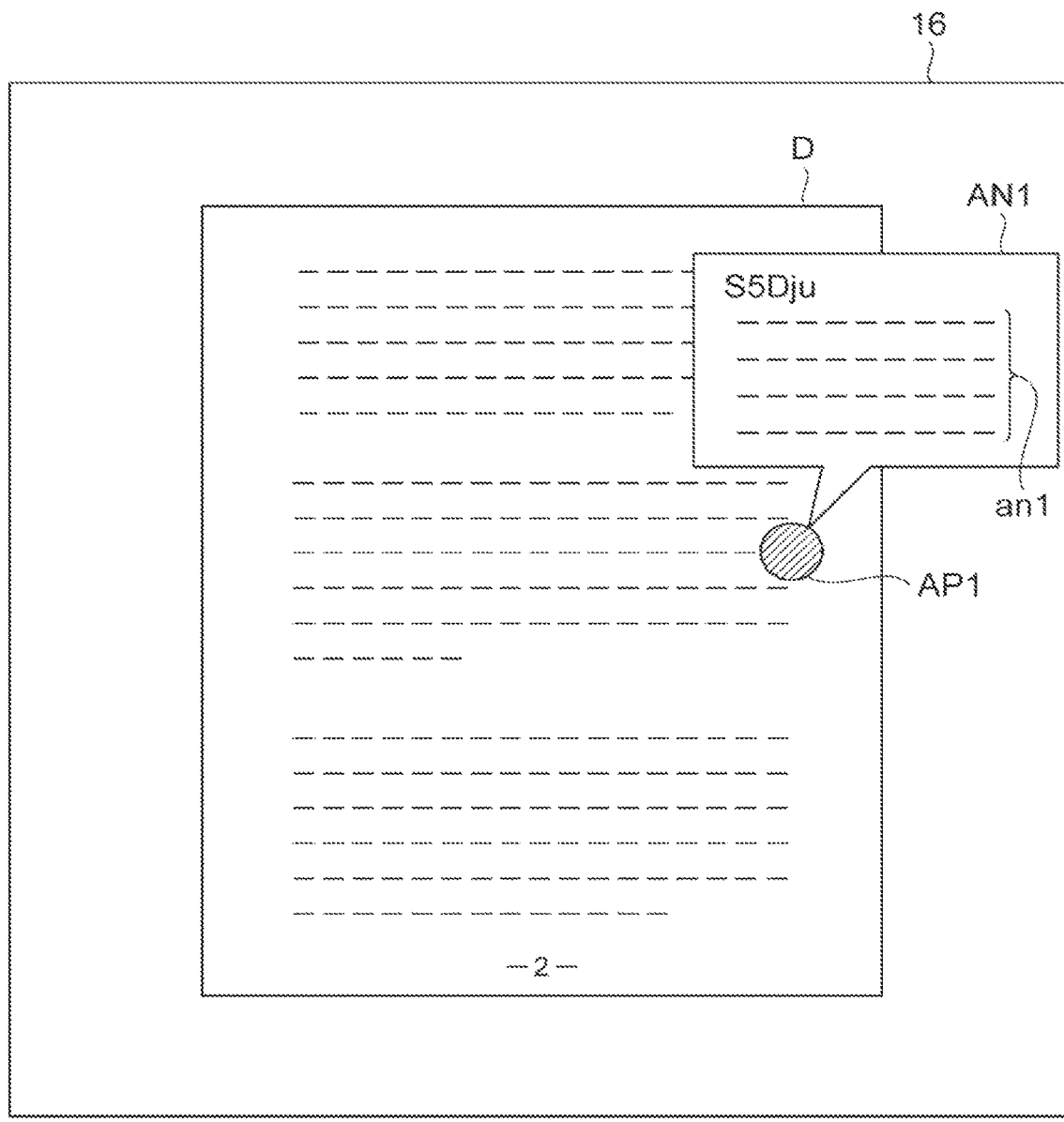
FIG. 8 is a view showing an example of output of annotation information.

The control unit 15 is a part that performs control so that annotation information is output in association with an annotation position corresponding to an annotation code contained in the annotation information. FIG. 8 is a view showing an example of output of annotation information. As shown in FIG. 8, the control unit 15 displays, on the display unit 16, the annotation information AN1 in association with the annotation position AP1 in the display information D. The annotation information AN1 contains at least part of the annotation content an1.

Note that the annotation content that is displayed in association with the annotation position AP1 may be the whole or part of the annotation content contained in the annotation information and stored. In the case where only part of the annotation content is displayed, an icon or the like to designate display of non-displayed part of the annotation content may be displayed as the annotation information. Further, in the case where the annotation content is a sound, an icon or the like to designate output of the annotation content from a speaker (an example of the output device 106) included in the information display device 1 may be displayed as the annotation information.

Further, the control unit 15 may perform control so that, when input of an annotation code is received by the reception unit 14, an annotation position associated with the received contained code in the display information D is displayed.

To be specific, when a user is viewing an electronic book, which is an example of display information, in the information display device 1, for example, after an annotation position specified by the user is received, the user can turn the pages to read further in the electronic book. After the electronic book is read further, when an image of an annotation code written in a paper medium is taken and thereby the annotation code is received by the reception unit 14, the control unit 15 performs control so as to display the annotation position associated with the received annotation code in the electronic book. By such display control, a user can easily recognize the specified annotation position. Further, when a predetermined operation is performed after displaying the annotation position, the control unit 15 may perform control so as to display the current position in the electronic book again.

The process control unit 19 performs control so that, when specification of a certain position is received by the specification reception unit, one of a process for generating and outputting an annotation code and a process for receiving input of annotation information is carried out in preference to the other. To be specific, when specification of a certain position in the display information D is received, in the case where the position for which specification is received is the position that is already specified as an annotation position and an annotation code corresponding to this annotation position is already generated and output, the process control unit 19 may perform control so that a process for receiving input of annotation information by the reception unit 14 is carried out in preference to a process for generating an annotation code by the generation unit 12 and outputting it by the output unit 13.

Figure 9:
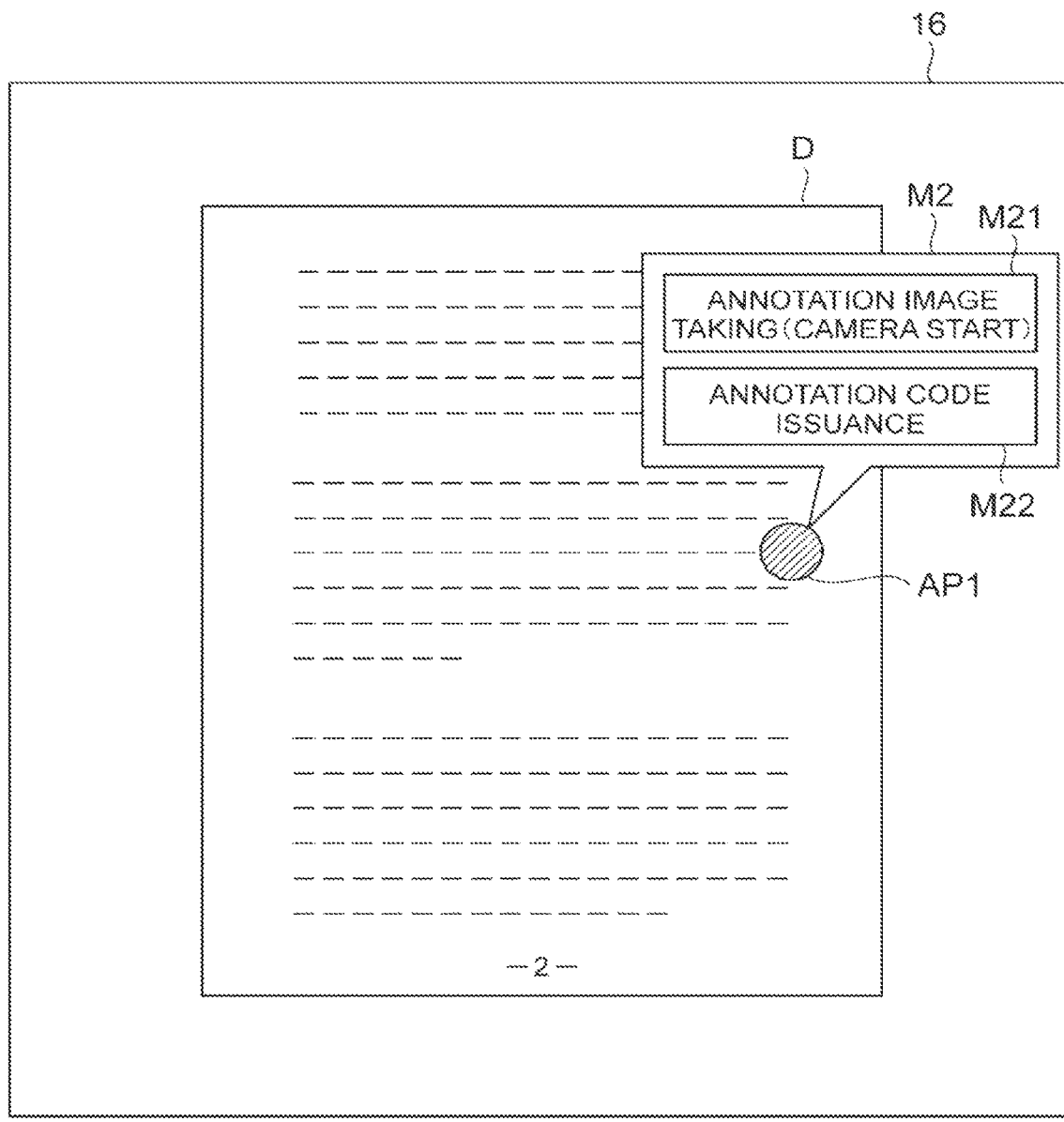
FIG. 9 is a view showing an example of process priority control by a control unit.

FIG. 9 is a view showing an example of process priority control by the process control unit 19. As shown in FIG. 9, in the case where specification of the annotation position AP2 in the display information D is received, and the position AP2 is a position which is already specified as an annotation position and where an annotation code corresponding to the position AP2 is already generated and output, the process control unit 19 displays the dialogue M2 that displays the menu item M21 "annotation image taking (camera start)" to designate image-taking (input) of annotation information at the top in preference to the menu item M22 "annotation code issuance". The menu item M21 is an item to designate a process for receiving input of annotation information. The menu item M22 is an item to designate a process for generating and output an annotation code. In this display, control may be performed so as to display the icon of the menu item M21 larger than the icon of the menu item M22 as shown in FIG. 9.

As control to carry out the process for receiving input of annotation information in preference to the process for generating and outputting an annotation code, the process control unit 19 may perform the process for receiving input of annotation information immediately or earlier than the other.

In the case where an operation to specify a position that is already specified as an annotation position and where generation, storage and output of an annotation code corresponding to this annotation position are done is received, it is highly probable that a user who has performed the operation to specify the position is about to input annotation information. By such priority control, when specification of a position that is already specified as an annotation position is received, the process for receiving input of annotation information is carried out in preference to the process for generating an annotation code etc., and it is thereby possible to input the annotation information promptly.

Further, in the case where specification of a certain position in the display information D is received and the display information D is displayed for the first time in the information display device 1, the process control unit 19 may perform control so that the process for generating an annotation code by the generation unit 12 and outputting it by the output unit 13 is carried out in preference to the process for receiving input of annotation information by the reception unit 14.

Figure 10:
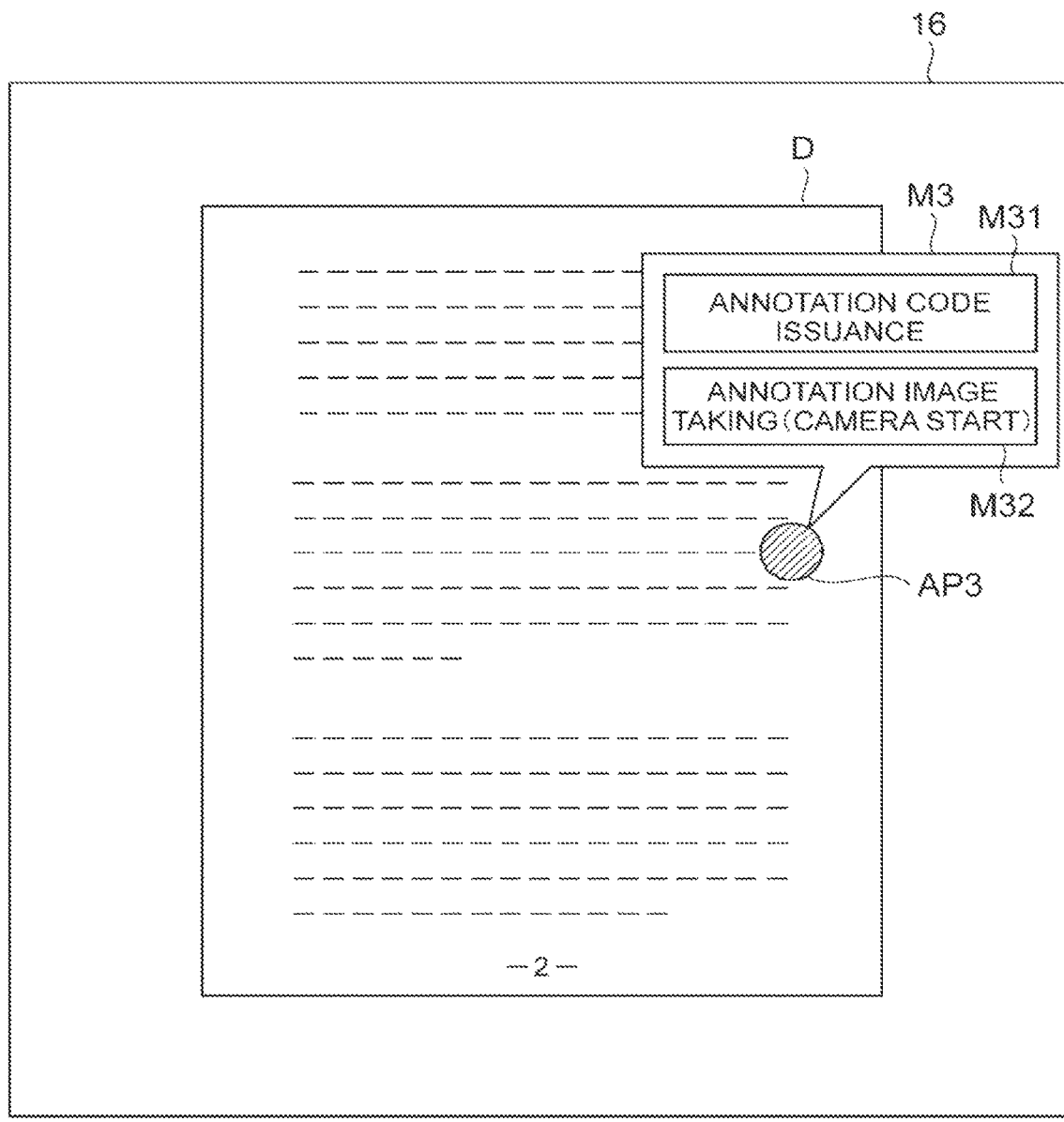
FIG. 10 is a view showing an example of process priority control by the control unit.

FIG. 10 is a view showing an example of process priority control by the process control unit 19. As shown in FIG. 10, in the case where specification of the annotation position AP3 in the display information D is received, and the display information D is displayed for the first time in the information display device 1, the process control unit 19 displays the dialogue M3 that displays the menu item M31 "annotation code issuance" at the top in preference to the menu item M32 "annotation image taking (camera start)" to designate image-taking (input) of annotation information. In this display, control may be performed so as to display the icon of the menu item M31 larger than the icon of the menu item M32 as shown in FIG. 10.

As control to carry out the process for generating and outputting an annotation code in preference to the process for receiving input of annotation information, the process control unit 19 may perform the process for generating and outputting an annotation code immediately or earlier than the other.

In the case where specification of a certain position in the display information D is received when the display information D is displayed for the first time in the information display device 1, it is highly probable that a user who has performed the operation to specify the position is about to specify an annotation position. By such priority control, when specification of a position is received in the display information D that is displayed for the first time in the information display device 1, the process for generating an annotation code etc. is carried out in preference to the process for receiving input of annotation information, and it is thereby possible to carry out the process related to generation of an annotation code promptly.

Further, in the case where specification of a certain position in the display information D is received and the display information D is displayed for the second or subsequent time in the information display device 1, the process control unit 19 may perform control so that the process for receiving input of annotation information by the reception unit 14 is carried out in preference to the process for generating an annotation code by the generation unit 12 and outputting it by the output unit 13. An example of such priority control is shown in FIG. 9.

Specifically, the process control unit 19 displays the dialogue M2 that displays the menu item M21 "annotation image taking (camera start)" to designate image-taking (input) of annotation information at the top in preference to the menu item M22 "annotation code issuance", for example. In this display, control may be performed so as to display the icon of the menu item M21 larger than the icon of the menu item M22.

As control to carry out the process for receiving input of annotation information in preference to the process for generating and outputting an annotation code, the process control unit 19 may perform the process for receiving input of annotation information immediately or earlier than the other.

In the case where specification of a certain position in the display information D is received when the display information D is displayed not for the first time in the information display device 1, it is highly probable that a user who has performed the operation to specify the position is about to input annotation information. By such priority control, when specification of a position is received in the display information D that has been displayed two or more times in the information display device 1, the process for receiving input of annotation information is carried out in preference to the process for generating an annotation code etc., and it is thereby possible to input the annotation information promptly.

Figure 11:
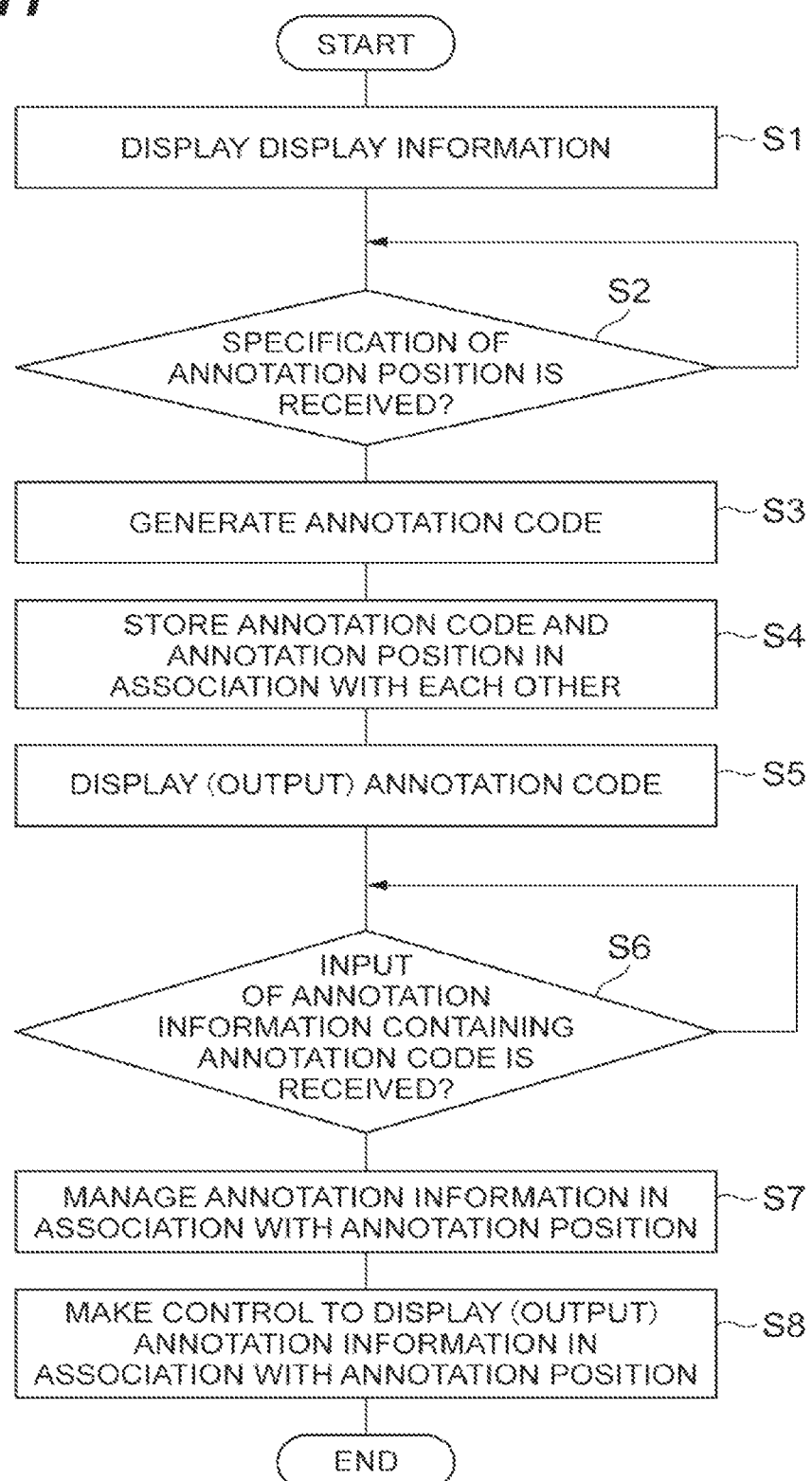
FIG. 11 is a flowchart showing a process of an information display method performed in the information display device.

The operation of the information display device 1 according to this embodiment is described hereinafter with reference to FIG. 11. FIG. 11 is a flowchart showing a process of an information display method performed in the information display device 1.

First, the control unit 15 displays the display information D on the display unit 16 (S1). The display unit 16 is an electronic book, for example. Next, specification reception unit 11 determines whether specification of an annotation position to be associated with an annotation in the display information D is received or not (S2). When it is determined that specification of an annotation position is received, the process proceeds to Step S3. On the other hand, when it is not determined that specification of an annotation position is received, the determination in Step S2 is repeated.

In Step S3, the generation unit 12 generates an annotation code corresponding to the annotation position (S3). Further, the generation unit 12 stores the generated annotation code in association with the annotation position into the annotation information storage unit 18 (S4). Then, the output unit 13 displays the generated and stored annotation code on the display unit 16 (S5). A user can thereby recognize and record (or memorize) the annotation code, and can input annotation information containing the recorded annotation code to the information display device 1 later on.

In Step S6, the reception unit 14 determines input of the annotation information containing the annotation code is received or not (S6). Input of the annotation information is implemented by taking an image of a document or the like in which the annotation code and the annotation content are written. When it is determined that input of the annotation information is received, the process proceeds to Step S7. On the other hand, when it is not determined that input of the annotation information is received, the determination in Step S6 is repeated.

In Step S7, the reception unit 14 manages the annotation information in association with the annotation position. To be specific, the reception unit 14 stores the received annotation information in association with the annotation code and the annotation position contained in the annotation information into the annotation information storage unit 18.

In Step S8, the control unit 15 performs control so that at least part of the annotation information is output in association with the annotation position corresponding to the annotation code contained in the annotation information (S8).

Figure 12:
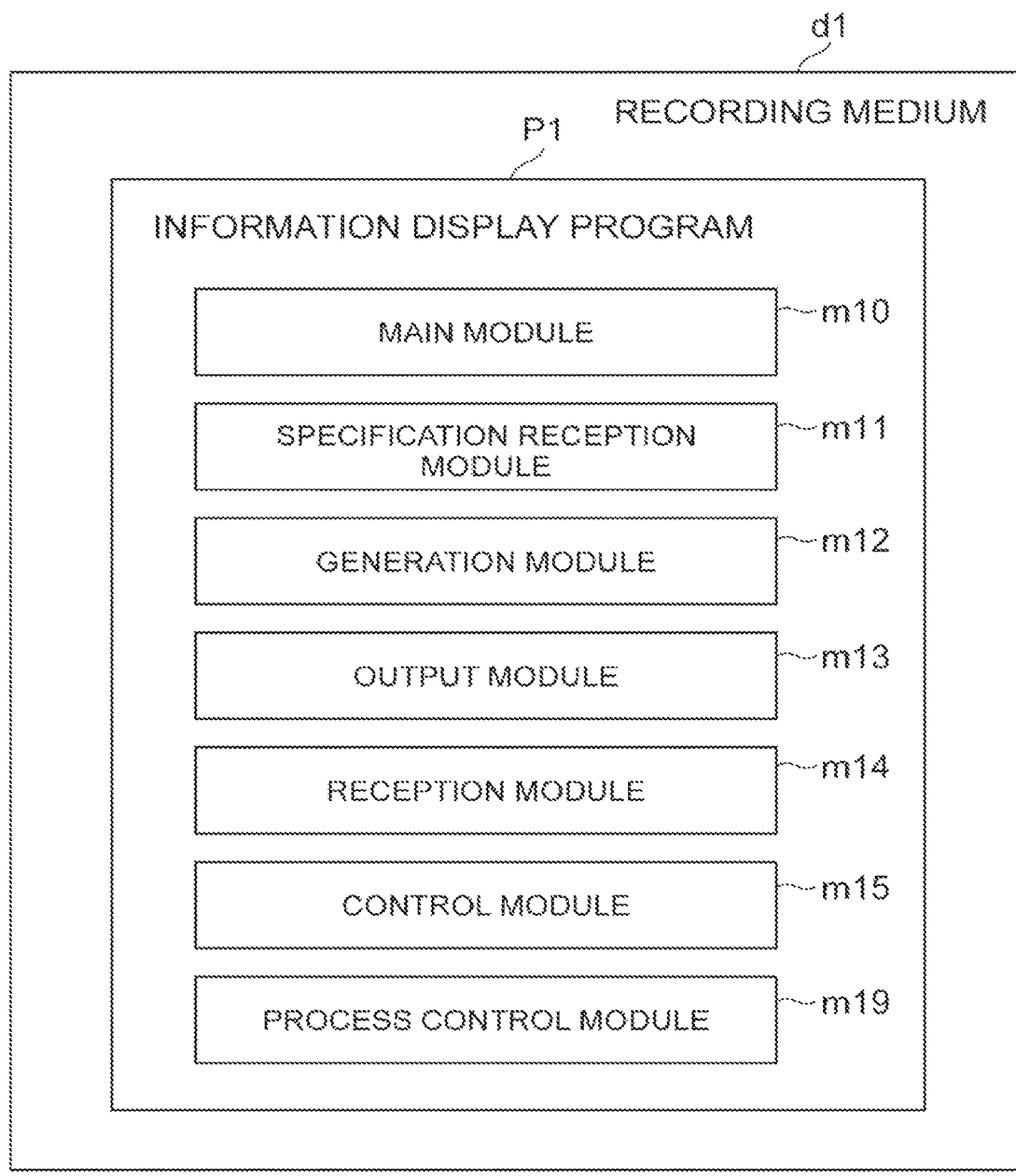
FIG. 12 is a view showing a configuration of an information display program.

An information display program that causes a computer to function as the information display device 1 is described hereinafter with reference to FIG. 12. An information display program p1 includes a main module m10, a specification reception module m11, a generation module m12, an output module m13, a reception module m14, a control module m15, and a process control module m19.

The main module m10 is a part that exercises control over the information display process. The functions implemented by executing the specification reception module m11, the generation module m12, the output module m13, the reception module m14, the control module m15 and the process control module m19 are respectively equal to the functions of the specification reception unit 11, the generation unit 12, the output unit 13, the reception unit 14, the control unit 15 and the process control unit 19 of the information display device 1 shown in FIG. 1.

The information display program p1 is provided by a storage medium d1 such as CD-ROM, DVD-ROM or semiconductor memory, for example. Further, the information display program p may be provided as a computer data signal superimposed onto a carrier wave through a communication network.

According to the information display device 1, the information display method and the information display program p1 according to the embodiment described above, when specification of an annotation position is received, an annotation code corresponding to the annotation position is generated and stored, and also output in a format recognizable to a user. Then, input of annotation information containing the annotation code is received, and when the annotation code matches the stored annotation code, the annotation information is controlled to be output at the position indicated by the annotation position corresponding to the annotation code. Thus, when a user desires to add an annotation to a certain position in display information, the user specifies this position as an annotation position, and the user can thereby recognize an annotation code. At the time when the content of the annotation is determined, the user inputs annotation information containing the content of the annotation together with the recognized annotation code, so that the annotation information is output in association with the annotation position. It is thereby possible to add an annotation by easy operation when the content of the annotation is determined.

An embodiment of the present invention is described in detail above. However, the present invention is not limited to the above-described embodiment. Various changes and modifications may be made to the present invention without departing from the scope of the invention. Although the annotation code is a character string composed of text in this embodiment, it may be sound information. In such a case, the output unit 13 outputs an annotation code to a speaker. A user can recognize the annotation code coming from the speaker by the sense of hearing. The reception unit 14 then receives input of the annotation code uttered by the user and detected by a microphone.

REFERENCE SIGNS LIST

1 . . . information display device, 11 . . . specification reception unit, 12 . . . generation unit, 13 . . . output unit, 14 . . . reception unit, 15 . . . control unit, 16 . . . display unit, 17 . . . imaging unit, 18 . . . annotation information storage unit, 19 . . . process control unit, d1 . . . storage medium, p1 . . . information display program, m10 . . . main module, m11 . . . specification reception module, m12 . . . generation module, m13 . . . output module, m14 . . . reception module, m15 . . . control module, m19 . . . process control module

The invention claimed is:

1. An information display device comprising:
circuitry configured to
receive specification of an annotation position as a placeholder indicating a position of an annotation in display information to be displayed on a display;
in response to specification of the annotation position being received, generate an annotation code corresponding to the annotation position, the annotation code being generated as the placeholder so that annotation content is associated with the annotation position at a later time, and store the generated annotation code in association with the annotation position into a memory;
output the generated annotation code in a format recognizable to an operator;
receive input of annotation information containing at least the annotation code and the annotation content, wherein the annotation information is originally generated separately from the information display device; and
perform control so that, when the annotation code contained in the received annotation information matches the annotation code stored in the memory, the annotation information is output at the position in the display information indicated by the annotation position corresponding to the annotation code.

2. The information display device according to claim 1, wherein
the circuitry controls the display to display a position in the display information at which the annotation information is to be output.

3. The information display device according to claim 1, wherein
the circuitry is further configured to perform control so that, when specification of a certain position is received, one of a process for generating and outputting the annotation code and a process for receiving input of the annotation information is carried out in preference to the other.

4. The information display device according to claim 3, wherein
when a position for which specification is received is a position already specified as an annotation position and an annotation code corresponding to the annotation position is already generated and output, the circuitry performs control so that a process for receiving input of the annotation information is carried out in preference to a process for generating and outputting the annotation code.

5. The information display device according to claim 3, wherein
when the display information is displayed for the first time in the information display device, the circuitry performs control so that a process for generating and outputting the annotation code is carried out in preference to a process for receiving input of the annotation information, and
when the display information is displayed for the second or subsequent time in the information display device, the circuitry performs control so that a process for receiving input of the annotation information is carried out in preference to a process for generating and outputting the annotation code.

6. The information display device according to claim 1, wherein
the circuitry is configured to set a validity period of the annotation code in accordance with an operation for specifying the annotation position, and
the validity period is a period where input of annotation information containing the annotation code can be received and where the annotation code is stored in association with the annotation position.

7. The information display device according to claim 1, wherein
the annotation code is one or more text letters.

8. The information display device according to claim 7, wherein
the circuitry is configured to generate, as the annotation code, a character string different from a character string contained in the display information.

9. The information display device according to claim 1, wherein
the annotation code is sound information.

10. The information display device according to claim 1, wherein
an annotation contained in the annotation information is composed of text or sound information.

11. An information display method in an information display device, the method comprising:
receiving specification of an annotation position as a placeholder indicating a position of an annotation in display information to be displayed on a display;
in response to specification of the annotation position being received, generating an annotation code corresponding to the annotation position, the annotation code being generated as the placeholder so that annotation content is associated with the annotation position at a later time, and storing the generated annotation code in association with the annotation position into a memory;
outputting the generated annotation code in a format recognizable to an operator;

receiving input of annotation information containing at least the annotation code and the annotation content, wherein the annotation information is originally generated separately from the information display device; and performing, using circuitry, control so that, when the annotation code contained in the received annotation information matches the annotation code stored in the memory, the annotation information is output at the position in the display information indicated by the annotation position corresponding to the annotation code.

12. A non-transitory computer readable recording medium including executable instructions, which when executed by a computer cause the computer to:

receive specification of an annotation position as a placeholder indicating a position of an annotation in display information to be displayed on a display;

in response to specification of the annotation position being received, generate an annotation code corresponding to the annotation position, the annotation code being generated as the placeholder so that annotation content is associated with the annotation position at a later time, and store the generated annotation code in association with the annotation position into a memory;

output the generated annotation code in a format recognizable to an operator;

receive input of annotation information containing at least the annotation code and the annotation content, wherein the annotation information is originally generated separately from the information display device; and perform control so that, when the annotation code contained in the received annotation information matches the annotation code stored in the memory, the annotation information is output at the position in the display information indicated by the annotation position corresponding to the annotation code.

* * * * *